(12) United States Patent
Ringler (10) Patent No.: US 10,207,799 B2
(45) Date of Patent: Feb. 19, 2019

(54) HEAVY-LIFT HIGH SPEED ROTARY WING

(71) Applicant: Lester M. Ringler, Needham, MA (US)

(72) Inventor: Lester M. Ringler, Needham, MA (US)

(\*) Notice: Subject to any disclaimer, the term of this patent is extended or adjusted under 35 U.S.C. 154(b) by 278 days.

(21) Appl. No.: 15/337,466

(22) Filed: Oct. 28, 2016

(65) Prior Publication Data

US 2017/0121017 A1     May 4, 2017

Related U.S. Application Data (60) Provisional application No. 62/247,325, filed on Oct. 28, 2015.

(51) Int. Cl.
| | |
|---|---|
| *B64C 27/06* | (2006.01) |
| *B64C 27/20* | (2006.01) |
| *B64C 39/06* | (2006.01) |
| *B64C 27/32* | (2006.01) |
| *B64C 39/00* | (2006.01) |

(52) U.S. Cl.
CPC .............. *B64C 27/20* (2013.01); *B64C 27/06* (2013.01); *B64C 27/32* (2013.01); *B64C 39/06* (2013.01); *B64C 39/001* (2013.01)

(58) Field of Classification Search
CPC ......... B64C 27/20; B64C 27/06; B64C 39/06; B64C 39/001; B64C 29/0025
USPC .......................................................... 416/179
See application file for complete search history.

(56) References Cited

U.S. PATENT DOCUMENTS

| | | | | |
|---|---|---|---|---|
| 4,075,781 A | * | 2/1978 | Hill, II .................... | A63H 33/18 446/48 |
| 5,190,242 A | * | 3/1993 | Nichols ................... | A63H 27/12 244/12.2 |
| 6,050,520 A | * | 4/2000 | Kirla ....................... | B64C 29/00 244/10 |

\* cited by examiner

*Primary Examiner* — Dwayne J White
*Assistant Examiner* — Wesley Le Fisher
(74) *Attorney, Agent, or Firm* — Brian M. Dingman; Dingman IP Law, PC (57) ABSTRACT

A rotary wing with a curved outer surface, inlet openings and an edge foil for use in helicopters to improve lift and efficiency, maximizing the gross weight lift and the horizontal flight speed capabilities and minimizing performance penalties and unstable, inefficient operation.

21 Claims, 14 Drawing Sheets

HEAVY-LIFT HIGH SPEED ROTARY WING

CROSS-REFERENCE TO RELATED APPLICATIONS

This application claims benefit from U.S. Provisional Patent Application No. 62/247,325, filed Oct. 28, 2015, the contents of which are incorporated herein by reference.

BACKGROUND

This disclosure relates to a rotary winged aircraft capable of vertical takeoff and landing. Currently existing rotary blade aircraft suffer from several design limitations that limit the gross weight lift and horizontal flight speed capabilities with performance penalties that make for unstable and inefficient operation.

The conventional rotary blade system for helicopters provides lift by coupling more than one rotor blade to a relatively vertical shaft around which the blades rotate. The rotating blades generate lift by creating low-pressure above the blades and directing air flow downward. This lift is transferred to the helicopter through a coupling of the rotating blades to the shaft, and the housing of the shaft within the helicopter. The lift and horizontal flight speed capabilities of helicopters are limited by a variety of factors such as vehicle gross weight, blade configuration, blade rotation speed, blade drag, etc. There is a need for reductions in the limitations which affect these performance characteristics of helicopters so that lift and horizontal flight speed capabilities may be improved, in addition to overall helicopter flight stability and efficiency.

SUMMARY

An object of the present invention is to propose a rotary wing with the general shape of an airfoil, much like the shape of an airfoil that is commonly used on fixed wing airplanes, around its perimeter. The top of the airfoil is longer than the underside, accelerating airflow laterally over the top of the wing during lateral movement, via the Bernoulli effect, and accelerating airflow downward over the edge of the wing via the Coanda effect. The preferred embodiment has a generally paraboloid-shape with a convex-shaped top outer surface and a concave-shaped inner surface with a plurality of inlet openings for the movement of directed air, an edge foil surrounding and connecting an outer shell circumference which may enclose the inlet openings, and inward blades utilized to draw air under the shell and downward, thereby directing an aircraft upward. The wing could be shaped in various manners, with a curved top outer surface, in order to produce the effects of accelerated lateral movement of air over the top of the wing, and accelerated downward movement of air over the edge of the wing. Embodiments may include one of the following features, or any combination thereof.

In one aspect, a heavy-lift high-speed rotary wing may be made of a variety of materials and shaped in manners which would accelerate downward airflow via the Coanda effect, while also accelerating lateral airflow via the Bernoulli effect. The rotary wing may be in the general shape of a paraboloid with a convex-shaped top outer surface, a concave-shaped inner surface, at least one central hole through and around the top center of the shell, and an outer shell rim which lies in a shell plane. An interior volume may exist between the inner surface of the shell and the shell plane, The perimeter of the central hole or holes in the shell may be coupled to a tube or multiple tubes extending into the interior volume, toward a vehicle such as a helicopter. There may be at least two inlet openings in the shell, symmetrically located around the central hole, the inlet openings allowing air to be drawn via the rotation of the rotary wing around its central axis which is at the center of the central hole or holes and perpendicular to the shell plane. The shell may have an edge foil surrounding the outer shell rim circumference and connecting the ends of blades and the edge foil may enclose the inlet openings. The blades may exist proximate and below each inlet opening, where each blade has a leading face that creates a vacuum to draw air through the inlet openings. There may be a plurality of attachment structures to transfer rotary motion to the rotary wing and to transfer lift from the rotary wing to a vehicle to be lifted by the rotating shell.

In another aspect, at least two inlet openings may be evenly spaced around the shell and they may be of a variety of shapes such as circular, oval, teardrop or other shapes symmetrically located on the shell. There may be at least two blades proximate and below the inlet openings. This symmetry attempts to negate possible adverse effects from leading faces of the blades. In addition, the edge foil that is coupled to the outer shell rim along the shell plane may be directed downward, below the shell plane. The edge foil may be angled toward a point where the central axis intersects the shell plane, but it may also be directed parallel to the central axis or even angled slightly away from the central axis. This shape of the shell and edge foil allow an aircraft to have forward motion without the characteristic losses and instabilities of a standard helicopter blade system.

In one embodiment, a tube may extend downward from the inner surface of the shell, around the perimeter of the central hole, and end proximate the shell plane. This tube length optimizes the air flow up and down the tube and the pressurization within the interior volume, both of which increase the lift capabilities of an aircraft. The tube could be multiple tubes within a larger tube or multiple individual tubes, each coupled to the inner surface of the shell to enable the flow of air in or out of the tubes. One or more of the tubes may extend downward from the inner surface of the shell, around the perimeter of the central hole, and end proximate the shell plane.

In one aspect, each blade may also feature a trailing face behind which air is pressurized and accelerated downward toward a vehicle such as a helicopter. Each blade may be symmetrically shaped so that the angle of the leading face is equal and opposite to that of the trailing face, but the shapes of the blades and angles of the leading and trailing faces could be varied, while remaining balanced under the shell. The air flows and pressures generated by the leading and trailing faces of each blade, provide the lift which directs the rotating shell upward, in the trajectory of the central axis around which the shell rotates.

In another embodiment, the upper ends of the blades may be coupled to the inner surface of the shell along the perimeters of the inlet openings which may be arc-shaped when viewed parallel to the shell plane. Inlet openings may be of a variety of shapes such as circular, oval, teardrop or other shapes symmetrically located on the shell. In yet another aspect, the lower ends of the blades may lie proximate the shell plane with the leading and trailing blade faces extending from the outer shell rim toward the central axis. The wing could feature two or more inlet openings of multiple possible shapes and two or more blades of a variety of possible shapes, as long as they are evenly spaced under the shell around the central axis. The wing could also feature an edge foil that extends downward from the shell rim and parallel to the central axis or angled slightly outward, away from the central axis. In this non-limiting example, each blade may be coupled to an attachment structure, and each attachment structure may be coupled to a hub through which rotational forces may be transferred between the rotary wing and an aircraft. Attachment structures may be in a variety of potential locations coupling the shell to a vehicle which provides rotary motion to the shell, and to which lift may be provided from the shell.

In another aspect, a rotating paraboloid-shaped shell allows the rotary wing to create a vacuum above it via the Coanda effect, accelerating airflow outward along the top, outer surface of the shell, and downward over the edge foil. This feature of the paraboloid-shaped shell increases the downward flow of air at the edge foil of the rotary wing as compared to existing blade designs which generate vortices at the ends of individual rotating blades. The inventive shell and edge foil combination may enable the rotary wing to behave as an airfoil while minimizing blade-end turbulence, and therefore increasing useable downward air flow. Reduced turbulence provides greater overall flight stability.

In one embodiment, as the rotational speed of the rotary wing increases, airflow may return as a column of airflow at the center of the wing and then flow through the interior volume of the shell where inside surfaces of the blades may create a vacuum via the Bernoulli effect and accelerate the airflow downward. Some of the airflow may escape upward through the tube or tubes and out the top of the shell. In addition, some of the airflow through the interior volume may be directed toward the edge foil and accelerated by the edge foil.

The outer surface of the shell and the edge foil may behave as an airfoil as utilized in a fixed-wing aircraft. The airfoil shape allows the rotary wing to accelerate downward airflow via the Coanda effect, while also accelerating lateral airflow via the Bernoulli effect. Lift may be generated through the movement of air over the surface of the wing and the air moved by the effects of the leading face and the trailing face of each blade residing within a space comprised of the interior volume and a space circumscribed by the edge foil, Existing blade designs generate and control lift by increasing the speed of the blade rotation, adjusting the leading edge angle of the rotating blades, and adjusting the blade system's angle of attack. Lift generated by the rotary wing may be controlled by the speed of its rotation.

BRIEF DESCRIPTION OF THE DRAWINGS

FIG. 5a is a view of cross-section 5-5 from FIG. 1a.

FIG. 5b is a perspective view of cross-section 5-5 from FIG. 1a.

DETAILED DESCRIPTION

The device described herein is one non-limiting example of a rotary wing constructed and arranged to enable efficient and stable heavy lifting without compromising the high speed forward flight of a vehicle such as a helicopter. The rotary wing reduces helicopter performance penalties incurred by conventional helicopter main rotor designs. The device could be utilized in a variety of other applications which involve the movement and pressurization of air or other masses. The preferred embodiment has the general shape of a paraboloid with a convex-shaped top outer shell surface ending at an outer shell rim. The shell need not be paraboloid shaped as long as it has a curved top outer surface so that it will behave as an airfoil, in that airflow above the wing is accelerated as compared to airflow below the wing. Therefore, various shapes may suffice, including but not limited to those that are close to being paraboloid-shaped, thus the scope is not limited to a strictly paraboloid shape. Embodiments may include one of the following features, or any combination thereof.

Figure 1A:
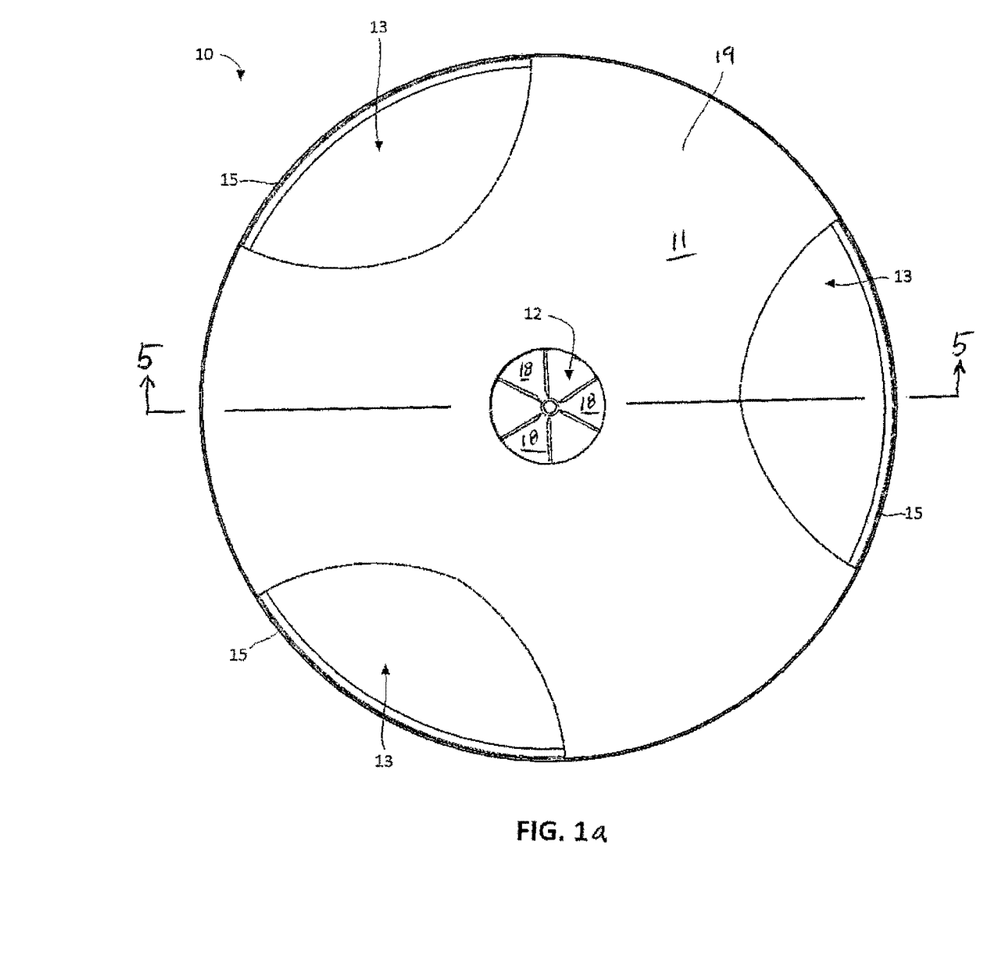
FIGS. 1a and 1b are top views of an embodiment of a heavy lift-high speed rotary wing, isolated and mounted on an aircraft, respectively.
Figure 1B:
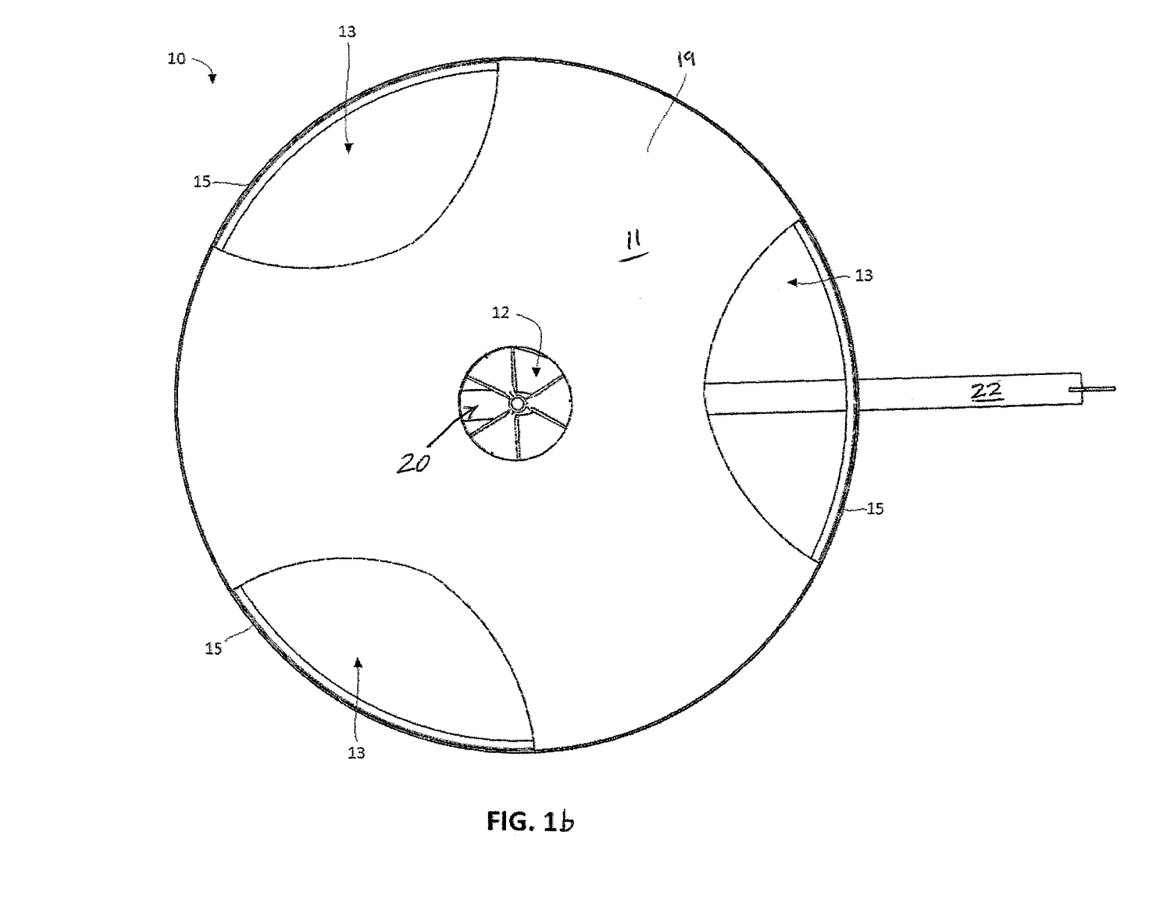

FIG. 1a is a top view of an embodiment of a heavy lift-high speed rotary wing 10 comprising a shell 11 made of a variety of materials in the general shape of a paraboloid with a convex-shaped top outer surface 19, at least one hole 12 through the top of the shell 11. There are a plurality of inlet openings 13 (in this non-limiting example there are three inlet openings 13 spaced at 120 degree intervals evenly spaced around the shell). There should be at least two openings, and the openings should be evenly spaced around the shell in order to balance forces created as the wing spins. The entire rotary wing is preferably circumscribed by an edge foil 15. A plurality of attachment structures 18 are visible through hole 12. FIG. 1b shows rotary wing 10 mounted upon aircraft 20 with tail 22 protruding laterally. Openings 13 are, in this example, generally arc-shaped when viewed from above, but they do not need to have this shape as long as they function to allow airflow through them, as further explained herein.

Figure 2A:
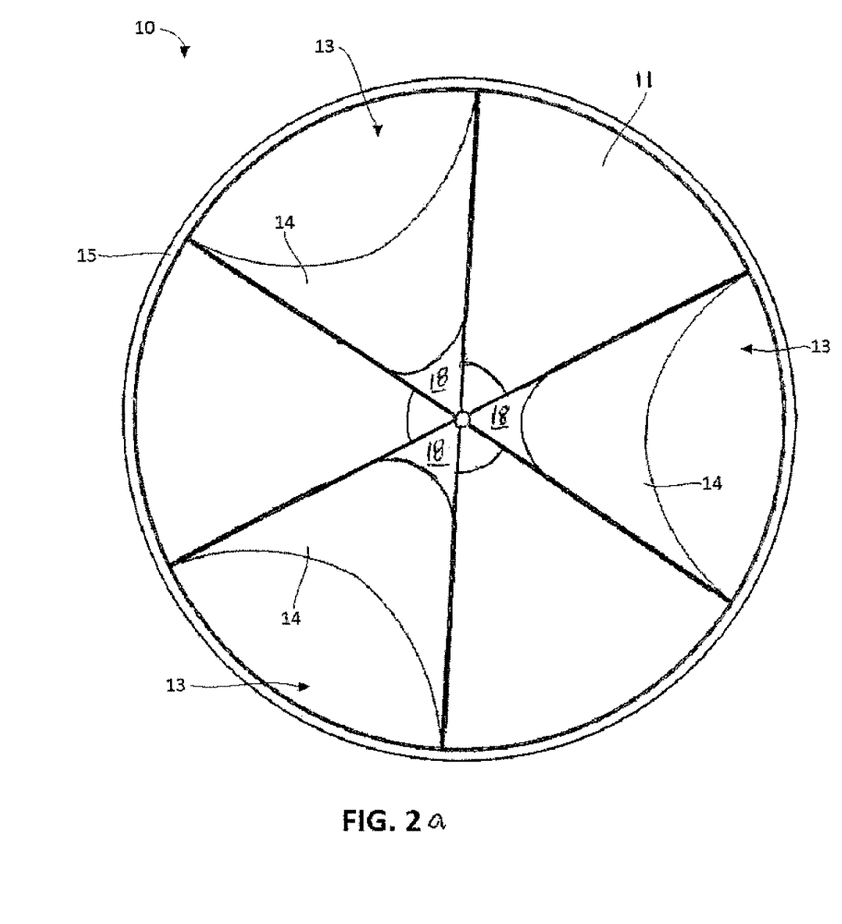
FIGS. 2a, 2b, and 2c are bottom views of embodiments of a heavy lift-high speed rotary wing; isolated, isolated alternate configuration, and mounted on an aircraft, respectively.
Figure 2B:
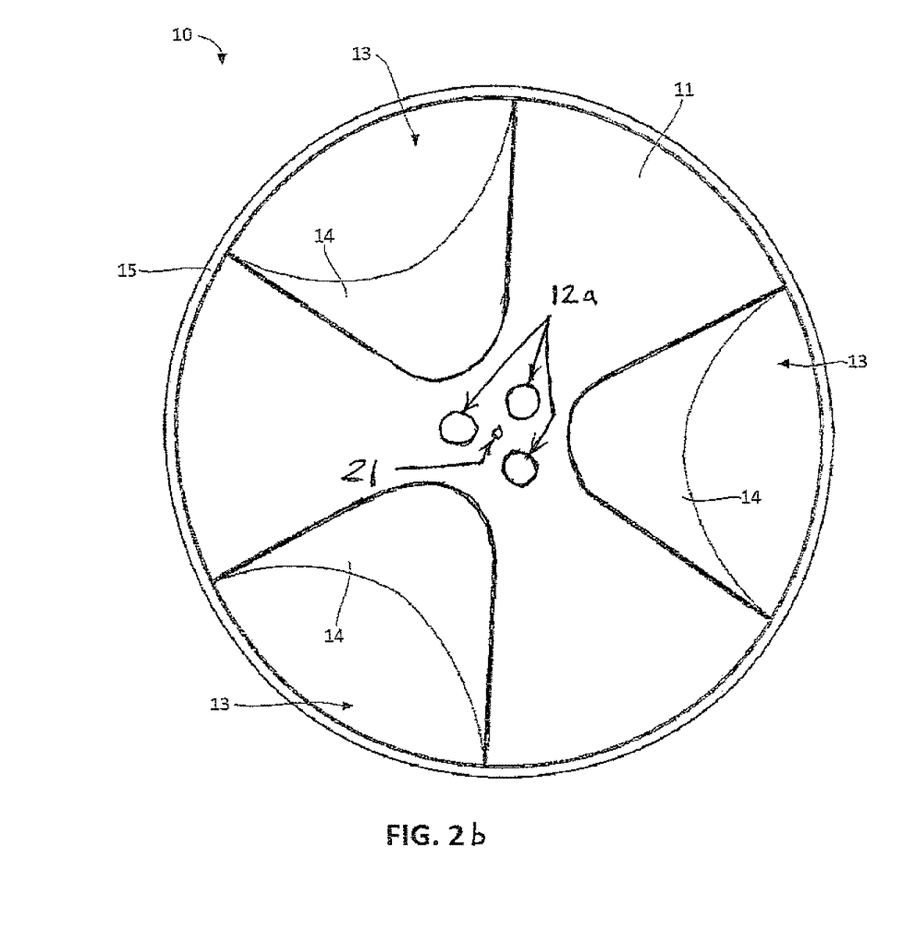
Figure 2C:
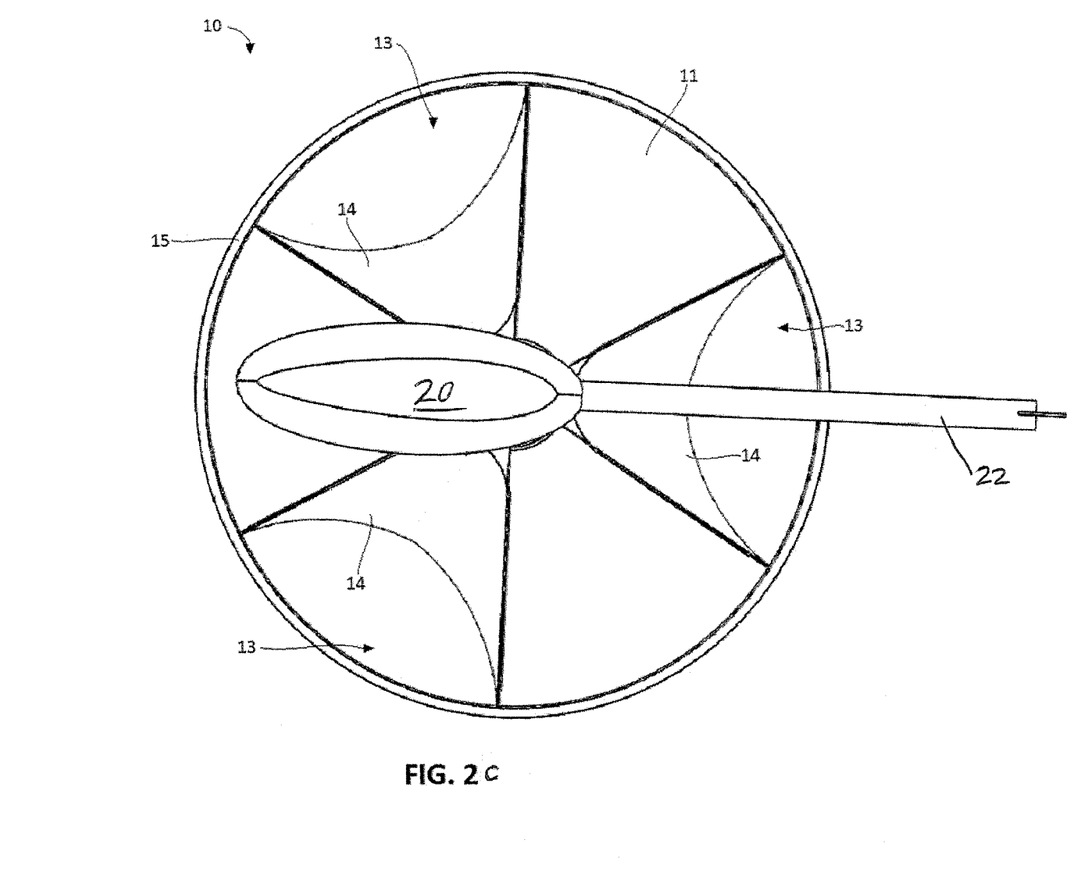

FIG. 2a is a bottom view of a heavy lift-high speed rotary wing 10. Shell 11 is circumscribed by edge foil 15 and has a plurality of inlet openings 13 facing a plurality of concave downward and inward blades 14 coupled to attachment structures 18. FIG. 2b shows rotary wing 10 with multiple holes 12a around hub 21, revealing an alternate configuration from that shown in FIG. 2a. FIG. 2c shows rotary wing 10 mounted upon aircraft 20 with tail 22 protruding laterally.

Figure 3:
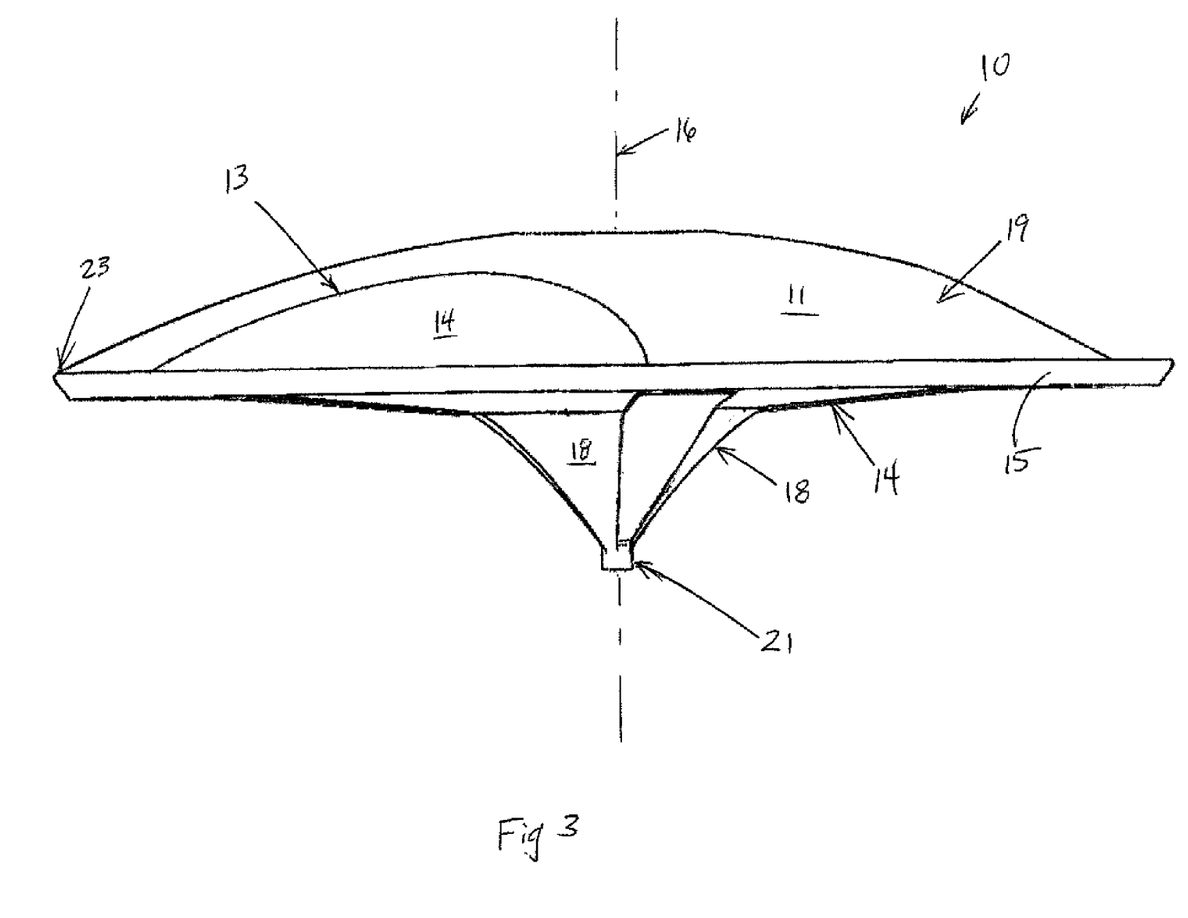
FIG. 3 is a side view of an embodiment of a heavy lift-high speed rotary wing.

FIG. 3 is a side view of a heavy life-high speed rotary wing 10. A non-limiting example of attachment structures 18 may be seen more clearly as they extend downward from where they are coupled to concave-shaped inward blades 14. In this embodiment, edge foil 15 is directed downward from outer shell rim 23 and angled inward. Attachment structures 18 couple to hub 21 and each inlet opening 13 connects to, and is encompassed by, edge foil 15.

Figure 4:
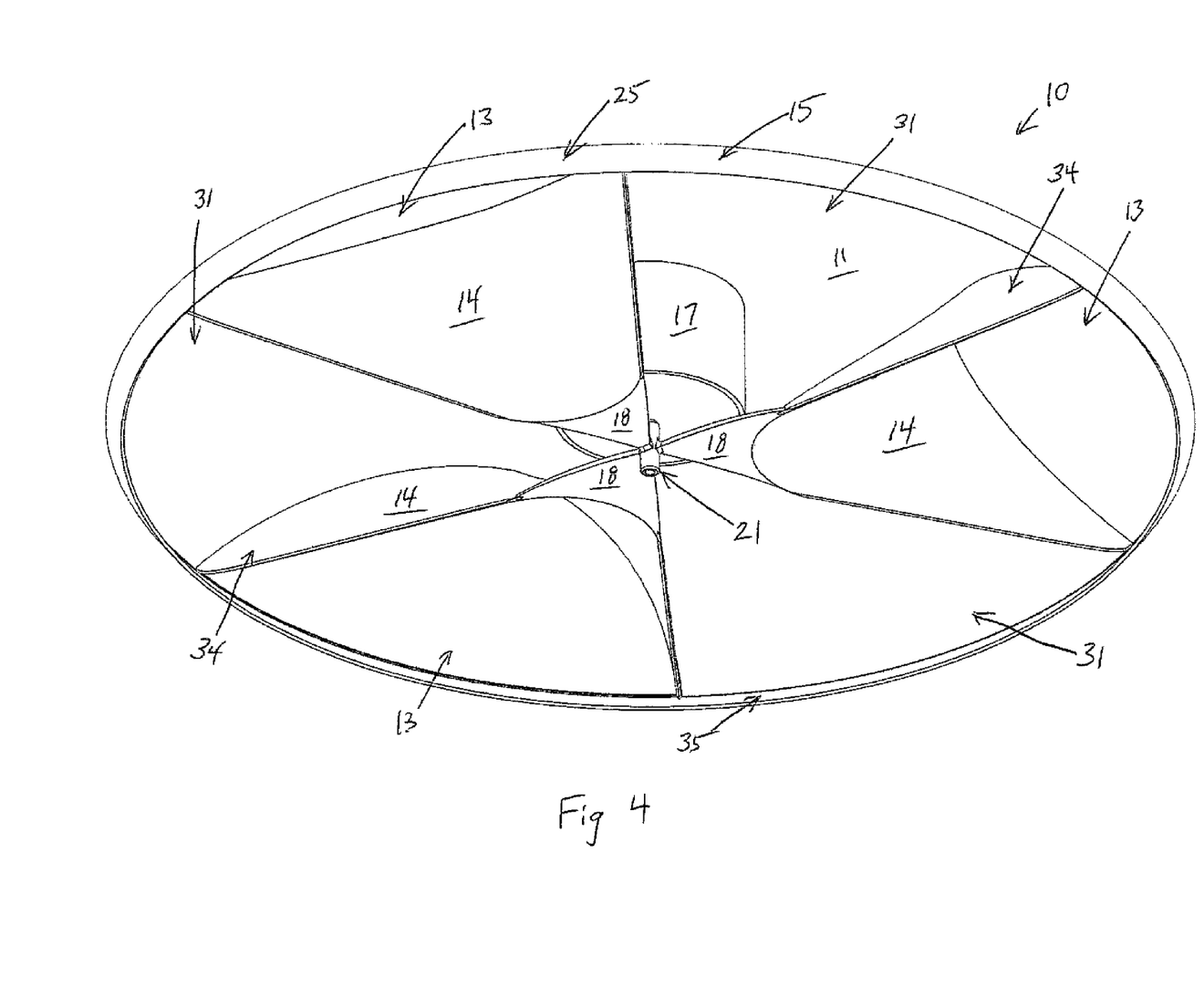
FIG. 4 is a perspective view of a bottom of an embodiment of a heavy lift-high speed rotary wing.

FIG. 4 is a perspective view of a bottom of a heavy lift-high speed rotary wing 10 comprising a paraboloid-shaped shell 11. There are a plurality of inlet openings 13 (in this non-limiting example there are three inlet openings 13 spaced at 120 degree intervals evenly spaced around the shell) with the entire rotary wing circumscribed by edge foil 15 with exterior surface 25 and interior surface 35. A plurality of attachment structures 18 join at hub 21. In this embodiment, blades 14 have an inside surface 34 and are coupled to attachment structures 18, blades 14 extending and coupling to shell 11, along the perimeter of inlet openings 13. The blades need to be proximate the openings but do not necessarily need to lie along the perimeters of the openings. Tube 17 is coupled to shell 11, extending downward from inner surface 31 of shell 11.

Figure 5A:
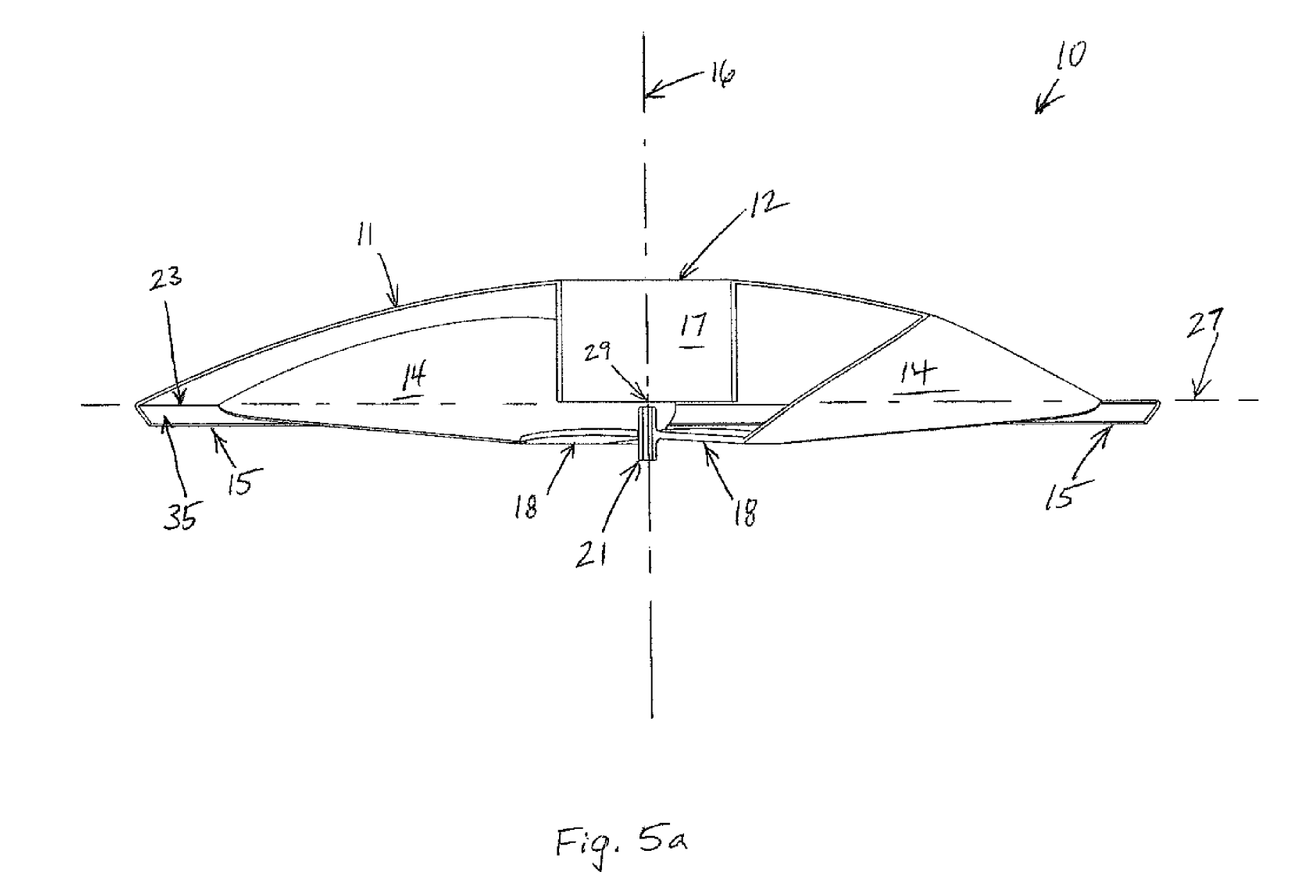

FIG. 5a is a cross-sectional view of a heavy lift-high speed rotary wing 10 taken along line 5-5 of FIG. 1a. This view provides a clear depiction of an embodiment of blades 14 located below shell 11. Also, two attachment structures 18 can be seen in order to understand how rotary wing 10 may be attached to an aircraft along central axis 16 at hub 21. In this embodiment, tube 17 is coupled to shell 11 along the perimeter of hole 12 in shell 11, tube 17 extending downward to its end located proximate shell plane 27 established by outer shell rim 23. Tube 17 could potentially be shorter or longer than this. Edge foil 15, with interior surface 35, faces blades 14 and is coupled to shell 11 at outer shell rim 23. Edge foil 15 is angled toward a point 29 where central axis 16 intersects shell plane 27, such that the edge foil is neither parallel with, nor perpendicular to the shell plane.

Figure 5B:
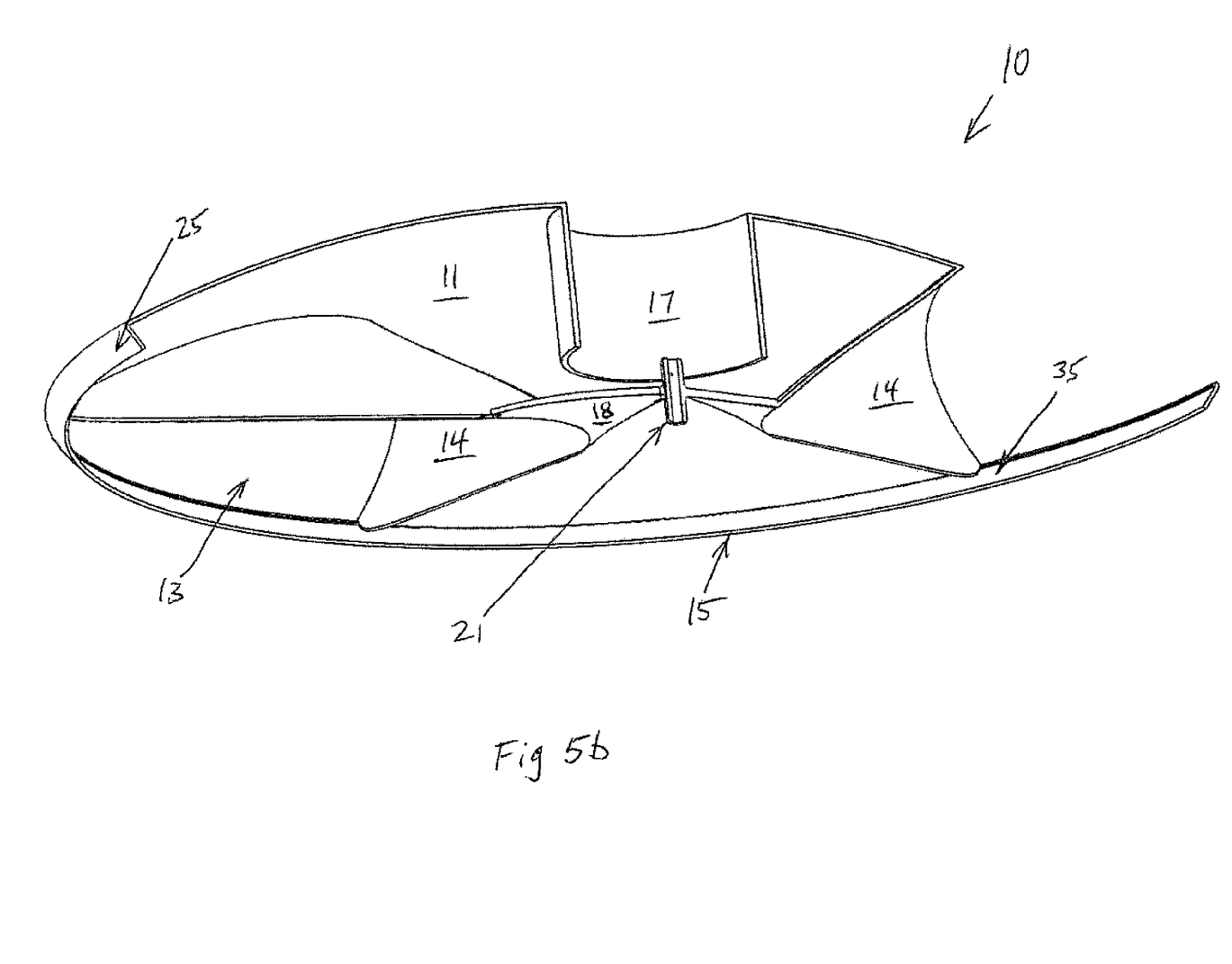

FIG. 5b is a bottom perspective view of a heavy lift high speed rotary wing 10 taken along line 5-5 of FIG. 1a. This view lends clarity to an embodiment of rotary wing 10 with blades 14 having a concave-shape, a shape and position of the tube 17, and one of the potential locations for attachment structures 18 with connections to hub 21. An angled view of inlet openings 13 and edge foil 15, with interior surface 35 and exterior surface 25, can also be seen for this embodiment of wing 10.

Figure 6:
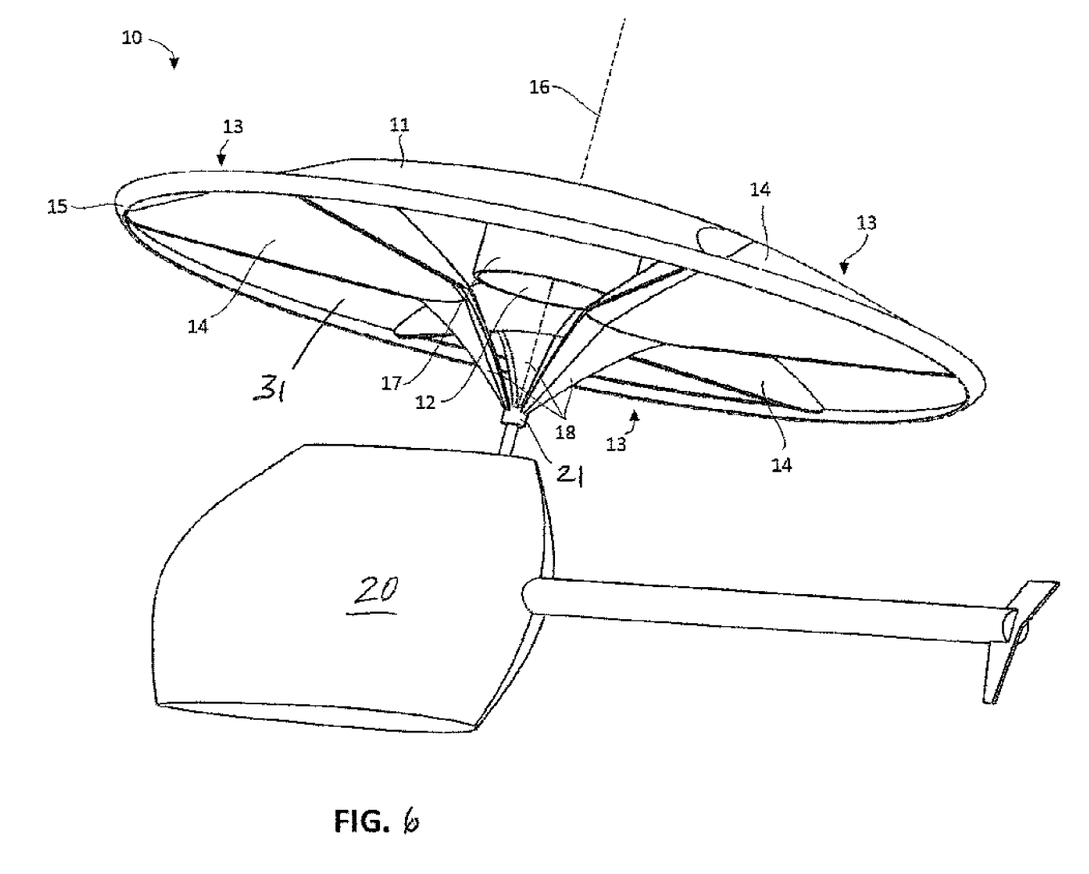
FIG. 6 is an isometric side-bottom view of an embodiment of a heavy lift-high speed rotary wing mounted to an aircraft.

FIG. 6 is a perspective side-bottom view of the heavy lift-high speed rotary wing 10 mounted upon vehicle 20. Tube 17 is attached to inner surface 31 of shell 11 along the perimeter of hole 12. In this embodiment, rotary wing 10 is rotated around axis 16 via hub 21 through a plurality of attachment structures 18. Attachment structures 18 are attached to blades 14, but they do not need to be attached to the blades. Blades 14 attach to inner surface 31 of shell 11 along the arc-shaped perimeters of inlet openings 13 in shell 11. A variety of other structures for attaching the shell to the aircraft are contemplated and included herein, each depending on the construction of the wing and the manner in which the wing is coupled to a particular aircraft.

Figure 7A:
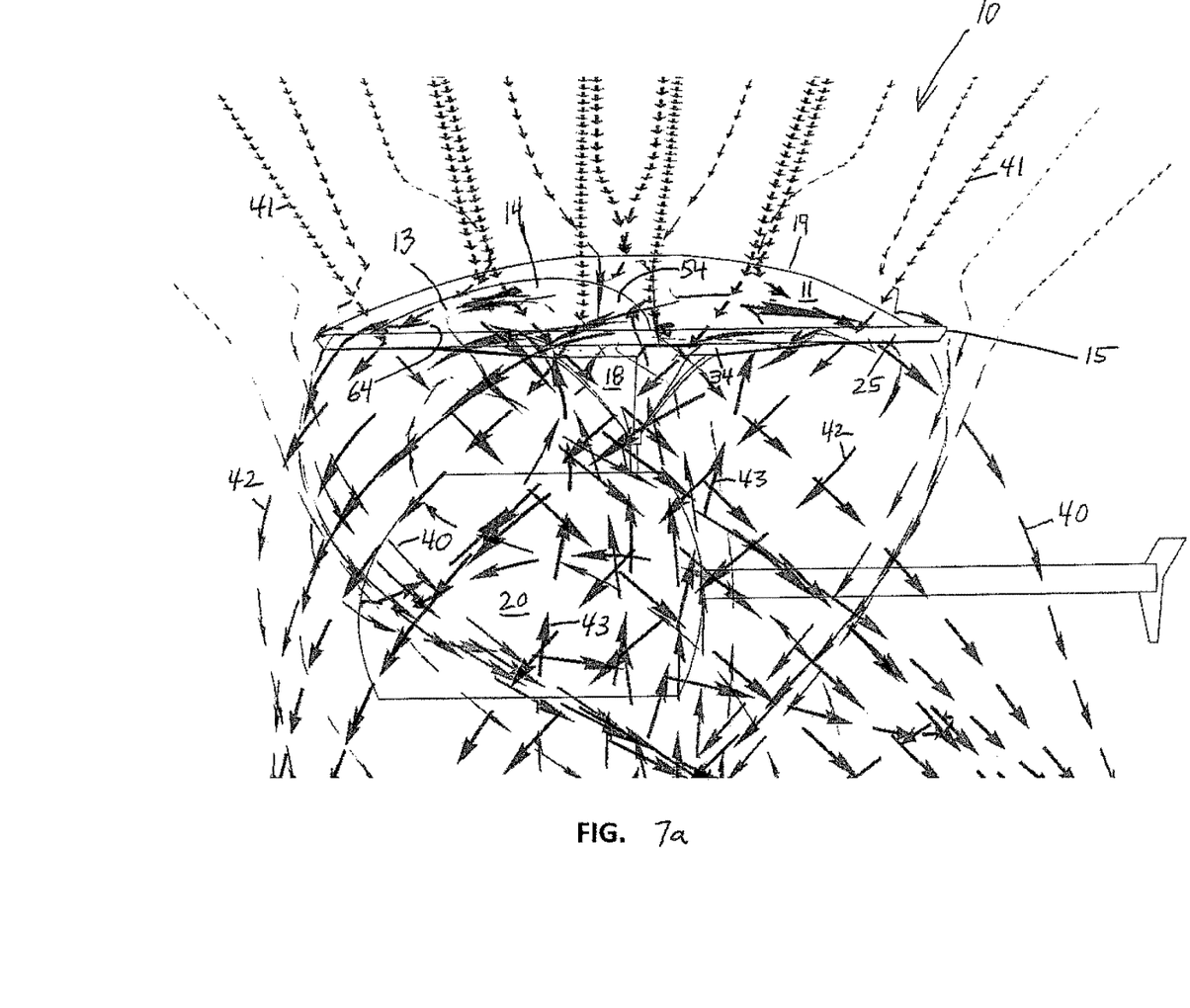
FIGS. 7a and 7b are descriptions of airflow during vertical flight of an embodiment of a heavy lift-high speed rotary wing; side view of wing and aircraft, side view with one blade and part of aircraft, respectively.
Figure 7B:
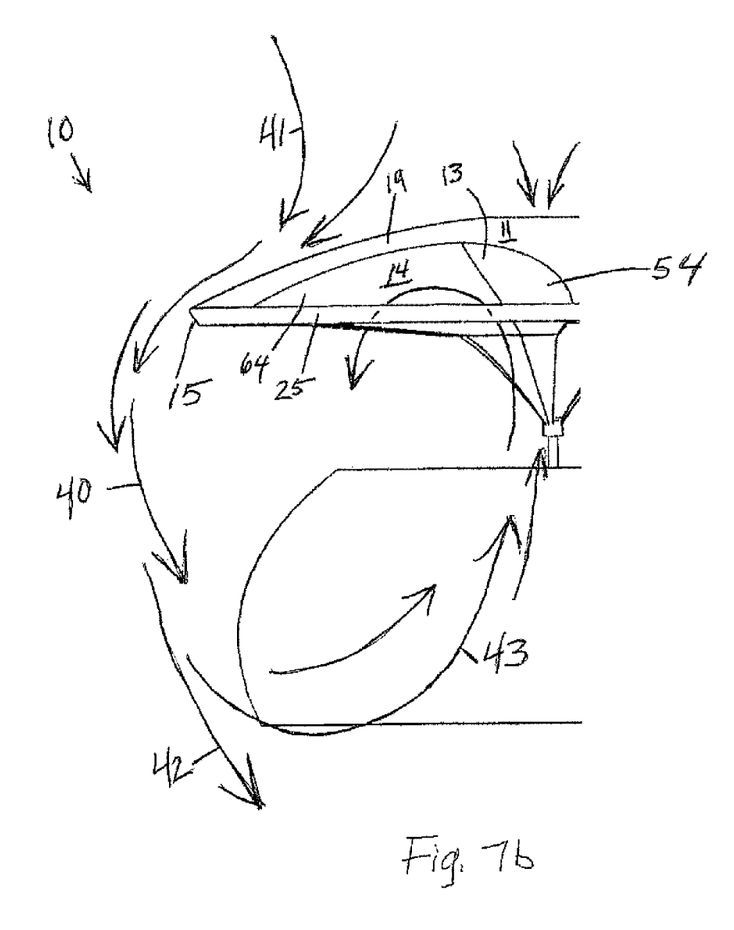

FIGS. 7a and 7b illustrate airflow while the rotary wing 10 is rotated counter-clockwise [viewed from above] during vertical operation. Operation is identical for clockwise operation but this figure describes counter-clockwise operation. The airflow arrows 40, 41, 42 and 43 denote airflow in the direction of the arrows, with the arrow's relative length denoting air speed and relative width denoting volume of airflow. The leading face 54 of blades 14 creates a vacuum drawing airflow 41 into inlet openings 13 in shell 11. The trailing face 64 of blades 14 then accelerates the airflow 42 downward. Shell 11 additionally creates a vacuum above it via the Coanda effect and accelerates airflow 41 outward where exterior surface 25 of edge foil 15 via the Coanda effect accelerates it downward joining airflow 42. Airflow 42 becomes a laminar flow downward for a distance before returning as a column of airflow 43 toward tube 17 (best viewed on FIG. 4) of the of the heavy lift-high speed rotary wing 10. The airflow 43 then flows through the interior volume of the heavy lift-high speed rotary wing 10 where inside surface 34 of blades 14 (best viewed on FIG. 4) creates a vacuum via the Bernoulli effect and accelerates the airflow 40 downward in a parallel laminar flow. In addition, some of the returning airflow 43 escapes through tube 17 (best viewed on FIG. 4) where it joins the airflow 41 accelerated by outer surface 19 of shell 11. This action is replicated for the plurality of inlet openings 13 and blades 14. Inner surface 31 of shell 11 (best viewed on FIG. 4) functions similar to outer surface 19 of shell 11 (best viewed on FIG. 3) and assists via the Coanda effect in accelerating airflow 43 toward interior surface 35 of edge foil 15 (best viewed on FIGS. 4, 5a and 5b) where it functions like exterior surface 25 of edge foil 15 (best viewed on FIG. 4) and via the Coanda effect accelerates airflow 43 into laminar airflow 40. Laminar airflow 42 and 40 trap airflow 43 and with the addition of airflow 41 substantially raises the air pressure under the heavy lift-high speed rotary wing 10 contributing to the heavy lift ability of the heavy lift-high speed rotary wing 10.

Figure 8:
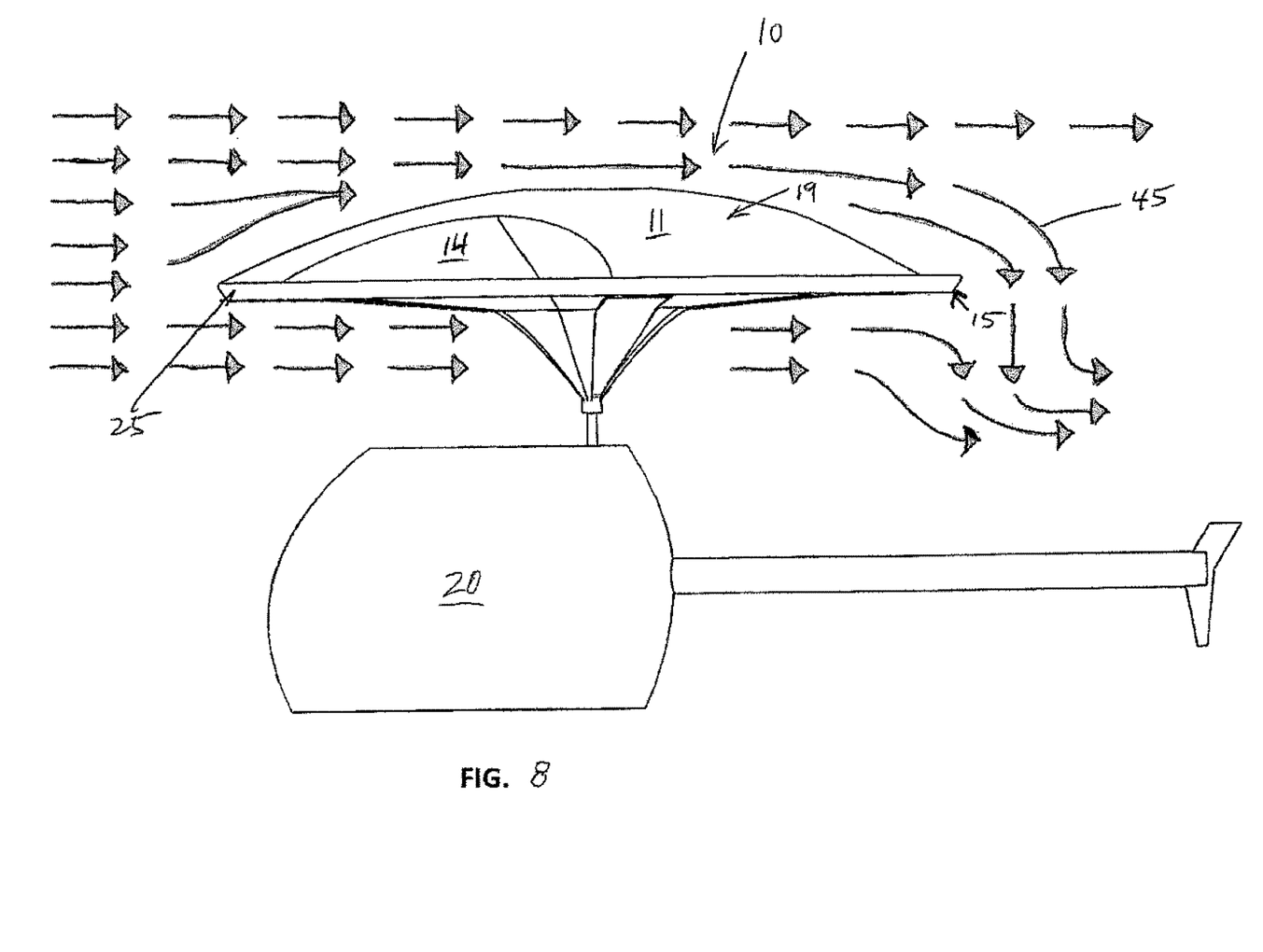
FIG. 8 is a description of airflow during high speed horizontal flight of an embodiment of a heavy lift-high speed rotary wing.

FIG. 8 describes airflow while the heavy lift-high speed rotary wing 10 is experiencing horizontal flight. The airflow arrows 45 denote airflow in the direction of the arrows with the relative length of the arrows denoting airspeed. The totality of outer surface 19 of shell 11 and exterior surface 25 of edge foil 15 define an airfoil much like the shape of an airfoil that is commonly used on fixed wing airplanes where the top of the airfoil is longer than the underside and accelerates airflow via the Bernoulli effect. Shell 11 and edge foil 15 protect blades 14 from strongly interacting with the free stream air flow 45. This protection prevents potential roll problems commonly associated with rotary winged aircraft during high speed horizontal flight where the attacking wing generates more lift than the retreating wing.

Figure 9:
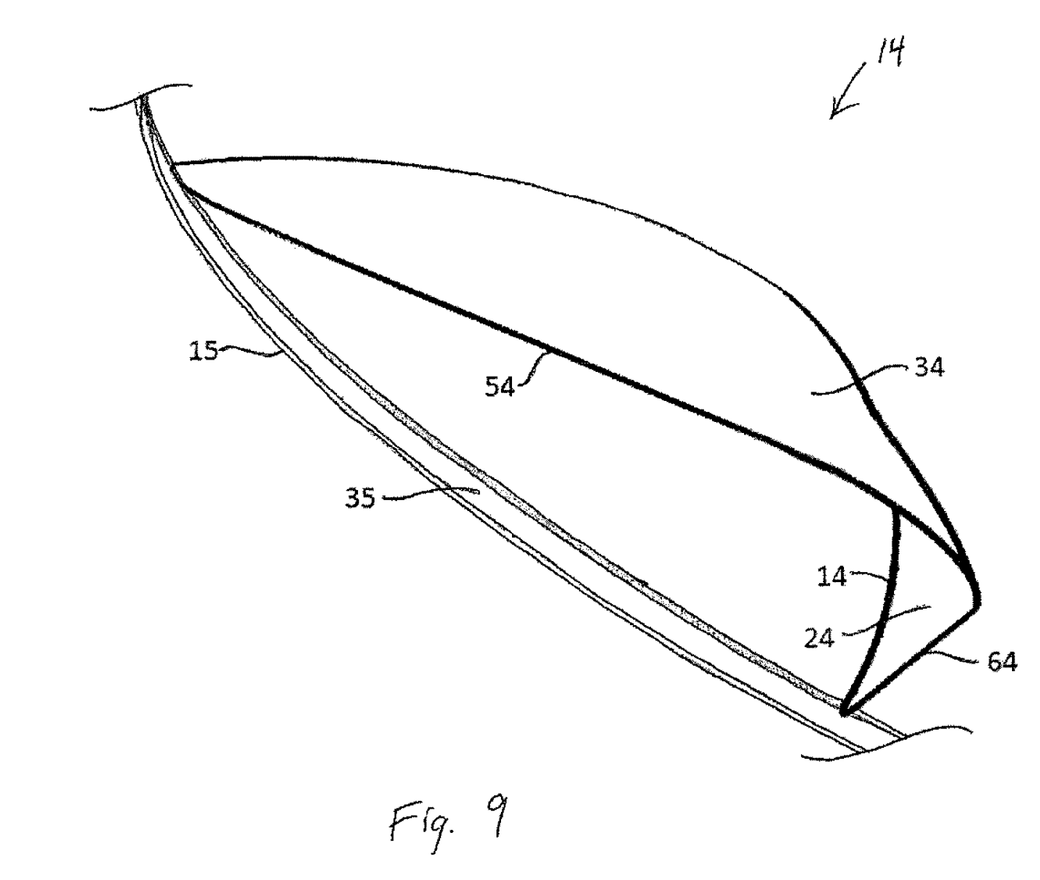
FIG. 9 is a detail view of a blade of the heavy-lift high speed rotary wing.

FIG. 9 illustrates a blade 14 from a heavy lift-high speed rotary wing with leading face 54 and trailing face 64. Blade inside surface 34 is on the convex side of blade 14 and blade outside surface 24 is on the concave side of blade 14, blade outside surface 24 facing the interior surface 35 of the edge foil 15.

A number of implementations have been described. Nevertheless, it will be understood that additional modifications may be made without departing from the scope of the inventive concepts described herein, and, accordingly, other embodiments are within the scope of the following claims.

What is claimed is:

1. A heavy lift high speed rotary wing, comprising:
a shell having a top, a curved outer surface, an inner surface, an outer shell rim that lies in a shell plane, and a center, wherein an interior volume is located between the shell plane and the inner surface of the shell;
at least one top opening around the center of the shell;
at least one tube coupled to the inner surface around the at least one top opening and extending into the interior volume;
at least two evenly spaced inlet openings around the shell;
an edge foil located at the outer shell rim;
at least one attachment structure directly or indirectly coupled to the shell and adapted to be coupled to an aircraft, the at least one attachment structure constructed and arranged to transfer rotary motion to spin the rotary wing and transfer lift from the rotary wing to the aircraft; and
a blade proximate and below each inlet opening, where each blade has a leading face that creates a vacuum, drawing airflow into the proximate inlet opening when the rotary wing is rotated.

2. The rotary wing of claim 1 wherein the inlet openings are evenly spaced around the shell.

3. The rotary wing of claim 1 wherein the edge foil is coupled to the outer shell rim and extending downward below the shell plane.

4. The rotary wing of claim 1 wherein the at least one tube begins at the at least one top opening and ends proximate the shell plane.

5. The rotary wing of claim 1 further comprising a trailing face on each of the blades that accelerates the airflow downward.

6. The rotary wing of claim 1 wherein the blades are symmetrically shaped.

7. The rotary wing of claim 1 wherein each blade has a curved concave-like shape, with an upper end coupled to the shell along the perimeter of an inlet opening.

8. The rotary wing of claim 1 wherein each inlet opening is generally arc-shaped when viewed parallel to the shell plane.

9. The rotary wing of claim 1 wherein each inlet opening connects with the edge foil.

10. The rotary wing of claim 1 wherein each blade has a lower end that lies proximate the shell plane.

11. The rotary wing of claim 1 wherein each blade is coupled to an attachment structure.

12. The rotary wing of claim 1 wherein the shell additionally creates a vacuum above it as the rotary wing spins, and accelerates airflow outward where an exterior surface of the edge foil accelerates it downward.

13. The rotary wing of claim 12 wherein airflow returns as a column of airflow toward the tube of the rotary wing and then flows through the interior volume of the rotary wing where an inside surface of the blades creates a vacuum and accelerates airflow downward.

14. The rotary wing of claim 13 wherein some of the returning airflow escapes upward through the tube and out the top of the shell.

15. The rotary wing of claim 14 wherein the interior volume of the rotary wing accelerates airflow toward an interior surface of the edge foil.

16. The rotary wing of claim 15 wherein the interior surface of the edge foil accelerates airflow.

17. The rotary wing of claim 16 wherein the outer surface of the shell and the exterior surface of the edge foil define the shape of an airfoil to accelerate airflow.

18. The rotary wing of claim 17 wherein lift is controlled via the rotational speed of the rotary wing.

19. A heavy lift high speed rotary wing, comprising:
   a shell having a top, a curved outer surface, an inner surface, an outer shell rim that lies in a shell plane, and a center, wherein an interior volume is located between the shell plane and the inner surface of the shell;
   an edge foil coupled to the outer shell rim and extending downward below the shell plane, wherein the outer surface of the shell and an exterior surface of the edge foil define the shape of an airfoil;
   a top opening around the center of the shell;
   at least two inlet openings in the shell, where the inlet openings are evenly spaced around the shell, each inlet opening is generally arc-shaped when viewed parallel to the shell plane, and each inlet opening connects with the edge foil;
   a tube coupled to the inner surface around the top opening and extending into the interior volume, wherein the tube begins at the top opening and ends proximate the shell plane;
   at least one attachment structure directly or indirectly coupled to the shell and adapted to be coupled to an aircraft, the at least one attachment structure constructed and arranged to transfer rotary motion to spin the rotary wing and transfer lift from the shell to the aircraft; and
   a blade proximate and below each inlet opening, where each blade has a leading face, a trailing face, a symmetrical curved concave-like shape with an upper end coupled to the shell along the perimeter of an inlet opening, and a lower end that lies proximate the shell plane;
   wherein when the rotary wing is spinning:
      the leading face of each blade creates a vacuum, drawing airflow into the proximate inlet opening;
      the trailing face accelerates airflow downward;
      the shell additionally creates a vacuum above it and accelerates airflow outward where an exterior surface of the edge foil accelerates it downward;
      airflow returns as a column of airflow toward the tube and then flows through the interior volume where an inside surface of the blades creates a vacuum and accelerates airflow downward;
      some of the returning airflow escapes upward through the tube and out the top of the shell;
      the interior volume of the shell accelerates airflow toward an interior surface of the edge foil;
      the interior surface of the edge foil accelerates airflow; and
   wherein lift is controlled via the rotational speed of the rotary wing.

20. The rotary wing of claim 19 wherein the shell is paraboloid-shaped;
   wherein three inlet openings are evenly spaced around the shell;
   wherein the edge foil is angled toward a point at which the central axis and the shell plane intersect; and
   wherein each blade is coupled to an attachment structure.

21. A heavy lift high speed rotary wing, comprising:
   a shell having a top, a curved outer surface, an inner surface, an outer shell rim that lies in a shell plane, and a center, wherein an interior volume is located between the shell plane and the inner surface of the shell;
   an edge foil coupled to the outer shell rim and extending downward below the shell plane, wherein the outer surface of the shell and an exterior surface of the edge foil define the shape of an airfoil;
   a top opening around the center of the shell;
   at least two inlet openings in the shell, where the inlet openings are evenly spaced around the shell, each inlet opening is generally arc-shaped when viewed parallel to the shell plane, and each inlet opening connects with the edge foil;
   a tube coupled to the inner surface around the top opening and extending into the interior volume, wherein the tube begins at the top opening and ends proximate the shell plane;
   at least one attachment structure directly or indirectly coupled to the shell and adapted to be coupled to an aircraft, the at least one attachment structure constructed and arranged to transfer rotary motion to spin the rotary wing and transfer lift from the shell to the aircraft; and
   a blade proximate and below each inlet opening, where each blade has a leading face, a trailing face, a symmetrical curved concave-like shape with an upper end coupled to the shell along the perimeter of an inlet opening, and a lower end that lies proximate the shell plane.

\* \* \* \* \*